United States Patent
Takuman et al.

(10) Patent No.: US 6,811,650 B2
(45) Date of Patent: Nov. 2, 2004

(54) ADHESIVE FOR SILICONE RUBBER

(75) Inventors: Osamu Takuman, Chiba Prefecture (JP); Hideo Shinmi, Chiba Prefecture (JP); Wataru Nishiumi, Chiba Prefecture (JP)

(73) Assignee: Dow Corning Toray Silicones, Ltd., Tokyo (JP)

( * ) Notice: Subject to any disclaimer, the term of this patent is extended or adjusted under 35 U.S.C. 154(b) by 0 days.

(21) Appl. No.: 10/044,199

(22) Filed: Jan. 9, 2002

(65) Prior Publication Data

US 2002/0129898 A1 Sep. 19, 2002

(30) Foreign Application Priority Data

Jan. 17, 2001 (JP) .................................... 2001-008387
Jul. 6, 2001 (JP) .................................... 2001-205916

(51) Int. Cl.$^7$ ................... C09J 183/04; C08L 83/00
(52) U.S. Cl. ................... 156/329; 427/387; 524/425; 524/588; 528/15; 528/31; 528/32
(58) Field of Search .................. 156/329; 524/425, 524/588, 433; 427/387; 528/15, 31, 32

(56) References Cited

U.S. PATENT DOCUMENTS 4,766,193 A    8/1988  Nakasuji et al.
4,889,576 A   12/1989  Suganuma et al.
6,166,121 A * 12/2000  Nishiumi et al. ............ 524/425
6,613,440 B2 * 9/2003  Hara et al. ................... 428/447

FOREIGN PATENT DOCUMENTS

JP    57195190 A  * 11/1982  ........... C10G/69/06
JP    10 060281      3/1998

* cited by examiner

Primary Examiner—Margaret G. Moore
Assistant Examiner—Marc S Zimmer
(74) Attorney, Agent, or Firm—McKellar Stevens, PLLC; Robert L. McKellar

(57) ABSTRACT

An adhesive for silicone rubber, comprising at least the following: A 100 parts by weight of an organopolysiloxane having an average of two or more alkenyl groups per molecule; B an organopolysiloxane having an average of two or more silicon bonded hydrogen atoms in each molecule, used in an amount such that the molar ratio of silicon bonded hydrogen atoms in component B to alkenyl groups in component A at which the molar ratio of the silicon bonded hydrogen atoms in this component to the alkenyl groups in component A is from 0.01 to 20 (i.e. from 1:100 to 20:1); C from 5 to 200 parts by weight of calcium carbonate powder with a BET specific surface area of from 5 to 50 m$^2$g; and D a platinum-based catalyst, used in an amount capable of inducing curing in the present composition.

9 Claims, No Drawings

ADHESIVE FOR SILICONE RUBBER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF INVENTION

The present invention relates to an adhesive for silicone rubber that can be readily bonded to silicone rubber materials.

BACKGROUND OF THE INVENTION

Silicone rubber materials are well known as having excellent water repellency, weatherability, heat resistance, and the like properties. Liquid silicone rubbers are used as coating agents or film-forming agents on a variety of substrates. However, these silicone rubbers have poor adhesive properties, and are therefore adapted for use with silicone rubber adhesives. Japanese patent application publication Kokai No. 61-278580, equivalent to U.S. Pat. No. 4,766,193, describes a number of adhesives used with liquid silicone rubbers which comprise organic peroxides, condensation catalysts and organopolysiloxanes having alkenyl groups and hydroxyl or alkoxy groups bonded to silicon atoms.

Japanese patent application publication Kokai 62-90369, equivalent to U.S. Pat. No. 4,889,576, discusses a method of adhering silicone-coated pieces of fabric together by overlapping silicone rubber-coated fabrics and inserting into the overlap region a silicone rubber adhesive. The silicone rubber adhesive is either an addition curing composition containing a platinum-type catalyst or a radical-curing composition containing an organoperoxide type catalyst. The overlap region containing the silicone rubber adhesive is hot-cured during or after press-adhering. In particular, Japanese patent application publication Kokai 62-90369, equivalent to U.S. Pat. No. 4,889,576, discloses a silicone composition that is cured by an addition reaction, but this composition still has inadequate adhesion.

Japanese patent application publication Kokai 10-60281 discloses a silicone composition that contains calcium carbonate powder surface treated with a partially hydrolysed condensate of a tetraalkoxysilane. The silicone rubber composition, containing the calcium carbonate filler treated with a hydrolysed condensate of tetraalkoxysilanes, provides a low evolution of a hydrogen gas during its storage, and has superior fluidity and electrical characteristics and is said to prevent foaming during the storage of the composition. There is no teaching in this document that the composition can be used as an adhesive for silicone rubber, and the adhesion of this composition to silicone rubber is still inadequate.

As a result of research aimed at overcoming the aforementioned shortcomings, the inventors have developed the present invention based on the fact that adequate adhesion to silicone rubber can be obtained by utilising an addition reaction curable silicone composition containing calcium carbonate powder with a prescribed BET specific surface area.

Specifically, an object of the present invention is to provide an adhesive for silicone rubber that has good adhesion to silicone rubber materials.

DETAILED DESCRIPTION OF THE INVENTION

In accordance with the present invention there is provided a silicone rubber adhesive composition comprising the following components:

A. 100 parts by weight of an organopolysiloxane having an average of two or more alkenyl groups per molecule;

B. an organopolysiloxane having an average of two or more silicon bonded hydrogen atoms in each molecule, in an amount such that the molar ratio of silicon bonded hydrogen atoms in component B to alkenyl groups in component A is from 0.01 to 20, i.e. from 1:100 to 20:1;

C. From 5 to 200 parts by weight of a calcium carbonate powder selected from the group of untreated calcium carbonate, calcium carbonate treated with an organic acid and calcium carbonate treated with an ester of an organic acid, said calcium carbonate having a BET specific surface area of from 5 to 50 $m^2/g$; and D. a platinum-based catalyst, in an amount sufficient to effect curing of the composition.

The organopolysiloxane of component A is the principal ingredient of the adhesive. This component is characterized by having an average of two or more alkenyl groups per molecule. Examples of such alkenyl groups include vinyl, allyl, butenyl, pentenyl, hexenyl, and heptenyl groups, of which the vinyl group is preferred. Examples of organic groups bonded to silicon atoms other than the alkenyl groups in component A include methyl, ethyl, propyl, butyl, pentyl, hexyl, and other alkyl groups; phenyl, tolyl, xylyl, and other aryl groups; and 3-chloropropyl, 3,3,3-trifluoropropyl, and other alkyl halide groups, of which groups the methyl group is preferred. Component A may have a molecular structure that is linear, partially branched linear, branched, reticulated, or dendritic. The viscosity of component A at 25° C., is preferably from 100 to 1,000,000 mPa·s, and most preferably from 100 to 500,000 mPa·s.

Examples of organopolysiloxanes which may be utilised as component A include polydimethylsiloxanes in which both ends of the molecular chain are blocked by dimethylvinylsiloxy terminal groups; dimethylsiloxane/methylvinylsiloxane copolymers in which both ends of the molecular chain are blocked by dimethylvinylsiloxy terminal groups; dimethylsiloxane/methylvinylsiloxane copolymers in which both ends of the molecular chain are blocked by trimethylsiloxy terminal groups; organopolysiloxanes comprising siloxane units expressed by the formula $(CH_3)_3SiO_{1/2}$, siloxane units expressed by the formula $(CH_3)_2(CH_2=CH)SiO_{1/2}$, and siloxane units expressed by the formula $SiO_{4/2}$; organopolysiloxanes obtained by methods in which some or all of the methyl groups of these organopolysiloxanes are substituted by alkyl groups such as ethyl, propyl, and the like, aryl groups, such as phenyl, tolyl, and the like, or alkyl halide groups such as 3,3,3-trifluoropropyl or the like; organopolysiloxanes obtained by methods in which some or all of the vinyl groups of these organopolysiloxanes are substituted by allyl, propenyl, or other alkenyl groups; and mixtures of two or more of these organopolysiloxanes.

Component B is an organopolysiloxane which functions as the cross-linking agent of the adhesive of the present invention. Component B is characterized by having an average of two or more silicon bonded hydrogen atoms (i.e. Si—H bonds) per molecule. The silicon bonded hydrogen atoms may be anywhere on the organopolysiloxane that forms component B, for example they may be on silicon atoms forming part of a terminal group at the end of the organopolysiloxane chain or on silicon atoms in non-terminal groups such as silicon atoms in the backbone of the organopolysiloxane polymer chain or, when present, in side chains of the organopolysiloxane polymer. The organic groups bonded to the silicon atoms in component B may include methyl, ethyl, propyl, butyl, pentyl, hexyl, and other alkyl groups; phenyl, tolyl, xylyl, and other aryl groups; and 3-chloropropyl, 3,3,3-trifluoropropyl, and other alkyl halide groups, of which the methyl group is preferred. Component B may have a linear, partially branched linear, branched, reticulated, or dendritic molecular structure. The viscosity of component B at 25° C., is preferably from 1 to 1,000,000 mPa·s, but most preferably from 1 to 10,000 mPa·s.

Examples of organopolysiloxanes which may be utilised as Component B include polydimethylsiloxanes in which both ends of the molecular chain are blocked by dimethyl hydrogen siloxy terminal groups; polymethyl hydrogen siloxanes in which both ends of the molecular chain are blocked by trimethylsiloxy terminal groups; dimethylsiloxane/methyl hydrogen siloxane copolymers in which both ends of the molecular chain are blocked by trimethylsiloxy terminal groups; cyclic polymethyl hydrogen siloxanes; organopolysiloxanes comprising siloxane units expressed by the formula $(CH_3)_2HSiO_{1/2}$ and siloxane units expressed by the formula $SiO_{4/2}$. Component B may also be an organopolysiloxane as described above in which some or all of the methyl groups have been replaced by alternative alkyl groups such as ethyl, propyl, isopropyl and the like, aryl groups such as phenyl and tolyl, and the like, or alkyl halide groups such as 3,3,3-trifluoropropyl or the like. Component B may, in a further alternative be a mixture of two or more of the above organopolysiloxanes. In the case where Component B comprises a mixture of polymers having Silicon bonded hydrogen atoms, it is preferred that the mixture comprises:

i. an organopolysiloxane having silicon bonded hydrogen atoms solely in terminal groups of the molecular chain; and ii. an organopolysiloxane having silicon bonded hydrogen atoms in non terminal groups.

Mixtures of this type are preferred because of the resulting mechanical characteristics, particularly improved elongation, of the resulting cured adhesive product.

The molar ratio of silicon bonded hydrogen atoms in component B to alkenyl groups in Component A is from 0.01 to 20, i.e. from 1:100 to 20:1, preferably from 0.1 to 10, i.e. from 1:10 to 10:1, and most preferably from 0.1 to 5, i.e. from 1:10 to 5:1. This is because the resulting cured adhesive tends to be inadequately cross-linked, and thereby is inadequately cured, if the content of component B is below the aforementioned range, and the mechanical characteristics of the resulting cured product tend to be adversely affected if the content exceeds the aforementioned range.

When component B is a mixture of:

i. an organopolysiloxane having silicon bonded hydrogen atoms solely in terminal groups of the molecular chain; and ii. an organopolysiloxane having silicon bonded hydrogen atoms in non terminal groups.

the molar ratio of silicon bonded hydrogen atoms in organopolysiloxane i to alkenyl groups in component A is preferably from 0.01 to 10, i.e. from 1:100 to 10:1, more preferably from 0.1 to 10, i.e. from 1:10 to 10:1 and most preferably from 0.1 to 5, i.e. from 1:10 to 5:1 and the molar ratio of silicon bonded hydrogen atoms in organopolysiloxane ii to alkenyl groups in component A is preferably from 0.5 to 20, i.e. from 1:2 to 20:1, more preferably from 0.5 to 10, i.e. from 1:2 to 10:1, and most preferably from 0.5 to 5, i.e. from 1:2 to 5:1. However it is essential that when Component B comprises a mixture of organopolysiloxanes such as organopolysiloxanes i and ii above, the total combined molar ratio of silicon bonded hydrogen atoms in the organopolysiloxanes making up the mixture of component B, e.g. organopolysiloxanes i and ii, to alkenyl groups in component A is within the range of from 0.01 to 20, i.e. from 1:100 to 20:1.

Component C is a calcium carbonate powder, as hereinbefore described, utilised in the present invention to improve the adhesion of the adhesive of the present invention to silicone rubber. The calcium carbonate powder is characterized as having a BET specific surface area of from 5 to 50 $m^2/g$, and preferably from 10 to 50 $m^2/g$. Examples of calcium carbonate powders suitable for use as component C in the present invention include untreated dry-ground calcium carbonate powders, which are also referred to as heavy calcium carbonates, untreated precipitated calcium carbonates, which are also known as light calcium carbonate, and powders obtained by treating the surfaces of these calcium carbonate powders with organic acids or their esters. Preferred organic acids are fatty acids, such as stearic acid and resin acids. Precipitated calcium carbonate powders are preferred, with precipitated calcium carbonate powders surface-treated with an organic acid such as a fatty acid or resin acid particularly preferred.

The content of component C in the adhesive of the present invention is from 5 to 200 parts by weight, and preferably from 10 to 100 parts by weight, per 100 parts by weight of component A. This is because the adhesion of the adhesive of the present invention to silicone rubber tends to decrease if the content of component C is below the aforementioned range, and a uniform adhesive is difficult to prepare if the content exceeds the aforementioned range.

Component D is a platinum-based catalyst for promoting the curing of the adhesive of the present invention. Examples of component D include fine platinum powder, platinum black, chloroplatinic acid, platinum tetrachloride, alcoholic solutions of chloroplatinic acid, platinum olefin complexes, platinum alkenyl siloxane complexes, platinum carbonyl complexes, and fine powders obtained by the dispersion of any of the above platinum-based catalysts in methyl methacrylate resins, polycarbonate resins, polystyrene resins, silicone resins, and other thermoplastic organic resins.

Component D of the adhesive of the present invention must be present in an amount sufficient to ensure that the adhesive composition will cure. Preferably, however component D is present in the adhesive of the present invention in an amount of from 0.01 to 500 parts by weight, and preferably from 0.1 to 100 parts by weight, per 1,000,000 parts by weight of component A when expressed as the content of platinum metal in component D.

Optionally a Component E may be added into the adhesive composition. Component E is a silica powder which is utilised to improve the mechanical strength of the resulting cured adhesive. Examples of component E include fumed silica, precipitated silica, baked silica, pulverized quartz, and powders obtained by treating the surfaces of the above silica powders with organosilicon compounds such as organoalkoxysilanes, organohalosilanes and organosilazanes. A silica powder with a BET specific surface area of at least 50 m²/g is preferably used as component E in order to adequately improve the mechanical strength of the resulting cured adhesive.

Whilst Component E is an optional ingredient, the adhesive of the present invention may comprise any appropriate amount of Component E but preferably comprises from 1 to 100 parts by weight, most preferably from 1 to 50 parts by weight, per 100 parts by weight of component A. Component E may be incorporated in the adhesive of the present invention to improve the mechanical strength of the resulting cured adhesive.

The following optional components may also be added to the adhesive of the present invention: fumed titanium oxide, carbon black, diatomaceous earth, iron oxide, aluminium oxide, aluminosilicates, calcium carbonate, zinc oxide, aluminium hydroxide, silver, nickel, and other inorganic fillers, as well as fillers obtained by treating the surfaces of these fillers with the aforementioned organosilicon compounds.

The following tackifiers may also be added to the adhesive of the present invention in order to enhance its adhesiveness: methyl trimethoxysilane, vinyl trimethoxysilane, allyl trimethoxysilane, 3-methacryloxypropyl trimethoxysilane, 3-glycidoxypropyl trimethoxysilane, 3-aminopropyl trimethoxysilane, N-(2-aminoethyl)-3-aminopropyl trimethoxysilane, bis(trimethoxysilyl)propane, bis(trimethoxysilyl)hexane, and other silane coupling agents; tetraethyl titanate, tetrapropyl titanate, tetrabutyl titanate, tetra(2-ethylhexyl)titanate, titanium ethyl acetonate, titanium acetylacetonate, and other titanium compounds; ethyl acetoacetate aluminium diisopropylate, aluminium tri(ethyl acetoacetate), alkyl acetoacetate aluminium diisopropylates, aluminium tris(acetoacetonate), aluminium monoacetyl acetonate bis(ethyl acetoacetate), and other aluminium compounds; and zirconium acetylacetonate, zirconium butoxyacetyl acetonate, zirconium bisacetylacetonate, zirconium ethylacetoacetate, and other zirconium compounds. The content of these tackifiers, when present, while not subject to limitations, should preferably be within a range of from 0.01 to 10 parts by weight per 100 parts by weight of component A.

The adhesive of the present invention may further contain one or more of the following curing inhibitors, which are used to enhance the storage stability, handleability, and workability of the resulting adhesive. Examples of the curing inhibitors which may be utilised for the present invention include 3-methyl-1butyn-3-ol, 3,5-dimethyl-1-hexyn-3-ol, 3-phenyl-1-butyl-3-ol, and other acetylene-based compounds; 3-methyl-3-penten-1-yn, 3,5-dimethyl-3-hexen-1-yn, and other en/yn compounds; 1,3,5,7-tetramethyl-1,3,5,7-tetravinyl cyclotetrasiloxane, 1,3,5,7-tetramethyl-1,3,5,7-tetrahexenyl cyclotetrasiloxane, methylvinyl siloxanes blocked by silanol terminal groups at both ends of the molecular chain, copolymers of methylvinyl siloxanes and dimethylsiloxanes blocked by silanol terminal groups at both ends of the molecular chain, and other organosiloxane compounds containing vinyl groups in each molecule in an amount of 5 wt % or greater; benzotriazole and other triazoles; and phosphines, mercaptans, hydrazines, and other curing inhibitors. When used in the adhesive of the present invention these curing inhibitors are preferably present in an amount of from 0.001 to 5 parts by weight per 100 parts by weight of component A.

Any suitable method may be used for the preparation of the adhesive in accordance with the present invention and as such the adhesive may be prepared by mixing components A to D and any of the optional components as needed in any order. However, in the case when component E is present in the adhesive of the present invention it is preferred that components B, C and D are added during or after the preparation of a base compound obtained by heating and mixing components A and E. When it is necessary to add one or more of the optional components, their addition may be made during the preparation of the base compound. However, if the optional ingredients may decompose during the high temperature mixing stage of the base compound preparation, their addition should preferably be made together with the addition of components B to D. It is also possible to add the aforementioned organosilicon compounds such as organoalkoxysilanes, organohalosilanes and organosilazanes to treat the surface of component E in situ when the base compound is prepared. Twin rollers, kneader/mixers, roll mixers, and other commonly known kneading apparatus can be used in order to prepare the adhesive of the present invention.

In a further embodiment of the invention there is provided a method of bonding silicone rubber to silicone rubber materials, said method comprising:

(I) treating a surface of the silicone rubber, or treating the surface of the silicone rubber material, or treating both the surface of a silicone rubber and a silicone rubber material with the adhesive composition of the present invention;

(II) contacting the treated surface of the silicone rubber with an untreated silicone rubber material, or contacting the treated surface of the silicone rubber material with an untreated silicone rubber material, or contacting the treated surface of the silicone rubber with the treated surface of the silicone rubber material to form a composite, and, (III) allowing the adhesive composition to cure.

EXAMPLES

The adhesive in accordance with the invention will now be described in further detail through working examples. All viscosity values provided in the examples were measured at 25° C.

Working Example 1

100 parts by weight of a polydimethylsiloxane blocked by dimethylvinylsiloxy terminal groups at both ends of the molecular chain having a viscosity of 40,000 mPa·s, 10 parts by weight of fumed silica having a BET specific surface area of 200 m²/g, 1.5 parts by weight of a hexamethyldisilazane surface-treated with silica, and 1 part by weight of water were uniformly mixed and then heated/mixed for 2 hours at a temperature of 170° C. under vacuum, to yield a base compound.

The following components were then admixed into 110 parts by weight of the base compound; 40 parts by weight of a precipitated calcium carbonate powder, Hakuenka CCR from Shiraishi K K, surface-treated with a fatty acid and provided with a mean grain size of 0.12 μm and a BET specific surface area of 18 m²/g; a polydimethylsiloxane blocked by dimethyl hydrogen siloxy terminal groups at both ends of the molecular chain having a viscosity of 10 mPa·s in an amount such that the molar ratio of silicon bonded hydrogen atoms in component B to vinyl groups in component A corresponds to a value of 0.2, i.e. 1:5; a dimethylsiloxane/methyl hydrogen siloxane copolymer having a viscosity of 6 mPa·s, an average of three silicon bonded hydrogen atoms in each molecule, and trimethylsiloxy blocking groups at both ends of the molecular chain, in an amount such that the molar ratio of silicon bonded hydrogen atoms in component B to vinyl groups in component A corresponds to a value of 2.8 i.e. 2.8:1; a dimethylsiloxane/methylvinylsiloxane copolymer, 0.2 parts by weight; content of vinyl groups: 10 wt %, blocked by silanol terminal groups at both ends of the molecular chain, provided with a viscosity of 40 mPa·s, and used as a curing inhibitor; 0.5 parts by weight of titanium tetrabutoxide; and a platinum 1,3-divinyl tetramethyldisiloxane complex, used in an amount of 30 parts by weight in terms of the platinum metal in the catalyst per 1,000,000 parts by weight of the polydimethylsiloxane in the base compound. The resulting adhesive was cured by being allowed to stand for 7 days at 25° C.

The hardness of the cured adhesive was measured with a Type A durometer in accordance with JIS K 6253.

The tensile strength and elongation of the cured adhesive was measured by the method described in JIS K 6251, using a dumbbell-shaped No. 3 test piece was fabricated according to JIS K 6251. The measurement results are shown in Table 1.

The adhesion of the adhesive to silicone rubber was measured as described below in accordance with the method detailed in JIS K 6854. The measurement results are shown in Table 1.

Two nylon tapes coated with silicone rubber having a width of 50 mm were laminated together such that the thickness of the adhesive was 0.5 mm, and the adhesive was cured by being allowed to stand for 7 days at 25° C. The resulting laminated tape was subjected to T-type peeling tests at rate of 200 mm/min.

Working Example 2

An adhesive for silicone rubber was prepared in the same manner as in Working Example 1 except that the polydimethylsiloxane, which was blocked by dimethyl hydrogen siloxy terminal groups at both ends of the molecular chain and had a viscosity of 10 mPa·s, and the dimethylsiloxane/methyl hydrogen siloxane copolymer which had a viscosity of 6 mPa·s, an average of three silicon bonded hydrogen atoms in each molecule, and trimethylsiloxy blocking groups at both ends of the molecular chain, used in Working Example 1 were replaced with a dimethylsiloxane/methyl hydrogen siloxane copolymer. This dimethylsiloxane/methyl hydrogen siloxane copolymer had a viscosity of 6 mPa·s, contained an average of three silicon bonded hydrogen atoms in each molecule, possessed trimethylsiloxy blocking groups at both ends of the molecular chain, and was used in an amount such that the molar ratio of silicon bonded hydrogen atoms in component B to vinyl groups in component A corresponds to a value of 3.0. The physical properties and adhesive power of the cured adhesive were measured in the same manner as in Working Example 1. The results are shown in Table 1.

Working Example 3

An adhesive for silicone rubber was prepared in the same manner as in Working Example 1 except that the precipitated calcium carbonate powder with a mean grain size of 0.12 μm and a BET specific surface area of 18 m²/g used in Working Example 1 was replaced with a precipitated calcium carbonate powder (MT-100 from Maruo Calcium) surface-treated with a resin acid and fashioned to have a mean grain size of 0.07 μm and a BET specific surface area of 17 m²/g. The physical properties and adhesive power of the cured adhesive were measured in the same manner as in Working Example 1. The results are shown in Table 1.

Comparative Example 1

An adhesive for silicone rubber was prepared in the same manner as in Working Example 1 except that the precipitated calcium carbonate powder with a mean grain size of 0.12 μm and a BET specific surface area of 18 m 2/g used in Working Example 1 was replaced with a dry-ground calcium carbonate powder (P-30 from Toyo Fine Chemical) having a mean grain size of 0.68 μm and a BET specific surface area of 3.4 m²/g. The physical properties and adhesive power of the cured adhesive were measured in the same manner as in Working Example 1. The results are shown in Table 1.

Comparative Example 2

An adhesive for silicone rubber was prepared in the same manner as in Working Example 1 except that the precipitated calcium carbonate powder with a mean grain size of 0.12 μm and a BET specific surface area of 18 m²/g used in Working Example 1 was replaced with a pulverized quartz powder (Crystallite VXS2 from Tatsumori) having a mean grain size of 5 μm and a BET specific surface area of 3.4 m²/g. The physical properties and adhesive power of the cured adhesive were measured in the same manner as in Working Example 1. The results are shown in Table 1.

TABLE 1

| Parameter | Example | | | | |
| --- | --- | --- | --- | --- | --- |
| | Working Example 1 | Working Example 2 | Working Example 3 | Comparative Example 1 | Comparative Example 2 |
| Hardness | 10 | 10 | 9 | 9 | 8 |
| Tensile strength (MPa) | 3.5 | 3.9 | 3.2 | 2.2 | 2.0 |
| Elongation (%) | 1500 | 1375 | 1450 | 1050 | 1100 |
| Adhesive power (kgf/50 mm) | 23 | 20 | 20 | 12 | 11 |

The inventive adhesive for silicone rubber is characterized by having good adhesion to silicone rubber materials.

What is claimed is:

1. A silicone rubber adhesive composition comprising:
   A. 100 parts by weight of an organopolysiloxane having an average of two or more alkenyl groups per molecule;
   B. an organopolysiloxane having an average of two or more silicon bonded hydrogen atoms in each molecule, in an amount such that the molar ratio of silicon bonded hydrogen atoms in component B to alkenyl groups in component A is from 0.01 to 20;
   C. from 5 to 200 parts by weight of a precipitated calcium carbonate powder selected from the group consisting of:
      (i) calcium carbonate treated with an organic acid and,
      (ii) calcium carbonate treated with an ester of an organic acid, said calcium carbonate powder having a BET specific surface area of from 5 to 50 m²/g; and
   D. a platinum-based catalyst, in an amount sufficient to effect curing of the composition.

2. A composition in accordance with claim 1, in which there is additionally provided a component E which is a silica powder in an amount of from 1 to 100 parts by weight per 100 parts by weight of component A.

3. A composition in accordance with claim 1, in which component B is a mixture of:

i an organopolysiloxane having silicon bonded hydrogen atoms solely in terminal groups of the molecular chain; and ii an organopolysiloxane having silicon bonded hydrogen atoms in non terminal groups.

4. A composition in accordance with claim i, in which the molar ration of silicon bonded hydrogen atoms in component B to alkenyl groups in component A is from 0.1 to 5.

5. A composition in accordance with claim 1 in which the calcium carbonate is pre-treated with a material selected from the group consisting of (i) a fatty acid and (ii) a resin acid.

6. A composition in accordance with claim 2 wherein the silica powder has a BET specific surface area of at least 50 $m^2/g$.

7. A method of making a silicone rubber adhesive as claimed in claim 2 wherein components B, C, and D, are added during the preparation of a base compound obtained by heating and mixing components A and E.

8. A method of making a silicone rubber adhesive as claimed in claim 2 wherein components B, C, and D, are added after the preparation of a base compound prepared and obtained by heating and mixing components A and E.

9. A method of bonding silicone rubber to silicone rubber materials, said method comprising:

I. treating a surface of the silicone rubber, or treating the surface of the silicone rubber material, or treating both the surface of a silicone rubber and a silicone rubber material with an adhesive composition;

II. contacting the treated surface of the silicone rubber with an untreated silicone rubber material, or contacting the treated surface of the silicone rubber material with an untreated silicone rubber material, or contacting the treated surface of the silicone rubber with the treated surface of the silicone rubber material to form a composite, and, III. allowing the adhesive composition to cure, wherein the adhesive composition is a silicone rubber adhesive composition comprising:

A. 100 parts by weight of an organopolysiloxane having an average of two or more alkenyl groups per molecule;

B. an organopolysiloxane having an average of two or more silicon bonded hydrogen atoms in each molecule, in an amount such that the molar ratio of silicon bonded hydrogen atoms in component B to alkenyl groups in component A is from 0.01 to 20;

C. from 5 to 200 parts by weight of a precipitated calcium carbonate powder selected from the group consisting of:

(i) calcium carbonate treated with an organic acid and, (ii) calcium carbonate treated with an ester of an organic acid, said calcium carbonate powder having a BET specific surface area of from 5 to 50 $m^2/g$; and D. a platinum-based catalyst, in an amount sufficient to effect curing of the composition.

* * * * *